United States Patent
Han et al.

(10) Patent No.: US 6,222,844 B1
(45) Date of Patent: Apr. 24, 2001

(54) FRAME RELAY INTERWORKING SERVICE CONTROL METHOD WITH ATM NETWORK USING A PERMANENT VIRTUAL CONNECTION

(75) Inventors: Mi Sook Han; Moon Kyun Oh; Seong Soon Joo, all of Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 09/126,620

(22) Filed: Jul. 31, 1998

(30) Foreign Application Priority Data

Dec. 9, 1997 (KR) .................................................. 97-67118

(51) Int. Cl.⁷ .................................................. H04L 12/56
(52) U.S. Cl. ........................................... 370/397; 370/399
(58) Field of Search .................................... 370/395–399, 370/402

(56) References Cited

U.S. PATENT DOCUMENTS

| | | |
|---|---|---|
| 5,490,140 | 2/1996 | Abensour et al. . |
| 5,490,141 | 2/1996 | Lai et al. . |
| 5,521,914 * | 5/1996 | Mavraganis et al. ................. 370/402 |
| 5,627,836 * | 5/1997 | Conoscenti et al. .................. 370/397 |
| 5,802,052 * | 9/1998 | Venkataraman ....................... 370/395 |
| 5,933,607 * | 8/1999 | Tate et al. ............................. 370/395 |
| 6,137,798 * | 10/2000 | Nishihara et al. .................... 370/397 |

* cited by examiner

Primary Examiner—Salvatore Cangialosi
(74) Attorney, Agent, or Firm—Antonelli, Terry, Stout & Kraus, LLP (57) ABSTRACT

The present invention relates to a frame relay interworking service control method using a permanent virtual connection, whereby a frame relay subscriber's service information is registered to ATM exchange system, ATM exchange system inner path to the frame relay connection due to registering the frame relay connection to the registered subscriber is connected by means of PVC the registered frame relay.

Such this invention is that the existing frame relay subscriber/network can be interworked with ATM exchange system without an extra device or function since ATM exchange system accommodates the frame relay interface.

19 Claims, 9 Drawing Sheets

| D_SUB_NAME(11) | D_ALS_NO(12) | D_IM_NO(13) | D_LINK_NO(14) |
|---|---|---|---|
| 129.254.13.54 | 0 | 8 | 16 |
| 042 860 4823 | 1 | 0 | 0 |
| ..... | ..... | ..... | ..... |

FIG. 3b

| D_IM_NO(13) | D_SUB_NAME(11) | D_LINK_NO(14) | D_SUB_NO(15) | D_ACC_UNIT(16) | D_CONN_MA(17) | D_ACC_RATE(18) |
|---|---|---|---|---|---|---|
| D_ADDR_FMT(19) | D_PROTO_MA(20) | D_CHANNEL_TYPE(21) | D_SERVICE_TYPE(22) | D_TIME_SLOT(23) | | |

FIG. 3c

| D_SUB_NAME(11) | D_DLCI(24) | D_IM_NO(13) | D_LINK_NO(14) | D_IN_VPI(25) | D_IN_VCI(26) | D_IN_CIR(27) |
|---|---|---|---|---|---|---|
| D_OUT_CIR(28) | D_IN_EIR(29) | D_OUT_EIR(30) | D_IN_BC(31) | D_OUT_BC(32) | D_IN_BC(33) | D_OUT_BE(34) |
| D_IN_PCR(35) | D_OUT_PCR(36) | D_ULPT(37) | | | | |

FIG.4a

| 7 | 6 | 5 | 4 | 3 | 2 | 1 | 0 | |
|---|---|---|---|---|---|---|---|---|
| GFC | | | | VPI | | | | 1 |
| VPI | | | | VCI | | | | 2 |
| VCI | | | | | | | | 3 |
| VCI | | | | PTI | | | CLP | 4 |
| HEC | | | | | | | | 5 |
| Payload 0 | | | | | | | | 6 |
| Payload 1 | | | | | | | | 7 |
| Payload 2 | | | | | | | | 8 |
| Payload 48 | | | | | | | | 53 |

| 7 | 6 | 5 | 4 | 3 | 2 | 1 | 0 |
|---|---|---|---|---|---|---|---|
| 0000 | | | | 1 | 1 | BD(3) | BD(2) |
| BD(1) | BD(0) | LI(1)/0 | LI(0) | 1 | SB(4) | SB(3) | SB(2) |
| SB(1) | SB(0) | DL(9) | DL(8) | DL(7) | DL(6) | DL(5) | DL(4) |
| DL(3) | DL(2) | DL(1) | DL(0) | PTI | | | CLP |
| HEC | | | | | | | |
| Payload 0 | | | | | | | |
| Payload 1 | | | | | | | |
| Payload 2 | | | | | | | |
| Payload 48 | | | | | | | |

FIG.4b

| GFC | | | | VPI | | | | 1 |
|---|---|---|---|---|---|---|---|---|
| VPI | | | | VCI | | | | 2 |
| VCI | | | | | | | | 3 |
| VCI | | | | PTI | | | CLP | 4 |
| HEC | | | | | | | | 5 |
| Payload 0 | | | | | | | | 6 |
| Payload 1 | | | | | | | | 7 |
| Payload 2 | | | | | | | | 8 |
| Payload 48 | | | | | | | | 53 |

| 7 | 6 | 5 | 4 | 3 | 2 | 1 | 0 |
|---|---|---|---|---|---|---|---|
| 0000 | | | | 1 | 1 | 0 | 0 |
| BD(1) | BD(0) | DL(16) | DL(15) | 1 | DL(14) | DL(13) | DL(12) |
| DL(11) | DL(10) | DL(9) | DL(8) | DL(7) | DL(6) | DL(5) | DL(4) |
| DL(3) | DL(2) | DL(1) | DL(0) | PTI | | | CLP |
| HEC | | | | | | | |
| Payload 0 | | | | | | | |
| Payload 1 | | | | | | | |
| Payload 2 | | | | | | | |
| Payload 48 | | | | | | | |

FRAME RELAY INTERWORKING SERVICE CONTROL METHOD WITH ATM NETWORK USING A PERMANENT VIRTUAL CONNECTION

BACKGROUND OF THE INVENTION

1. Field of the Invention

The present invention relates to a frame relay interworking service control method with ATM network using a permanent virtual connection and, more particularly, to a frame relay interworking service control method with ATM network using a permanent virtual connection, whereby a frame relay subscriber's service information is registered in ATM exchange system, ATM exchange system inner path to registered the frame relay connection due to registering the frame relay connection to the registered subscriber is connected to PVC.

2. Description of the Prior Art

Generally, ATM exchange system houses a Link which supports 1.544 Mbps (T1), 2.048 Mbps (E1), 44.736 Mbps (DS3), which performs a frame relay interworking divided into a first step, a second step, a third step. In the first step, the frame relay subscriber information is registered through a system operator interface, in the second step, one more frame relay connection is registered to the registered frame relay subscriber, in the third step, there is set PVC for connecting ATM switch path between the registered frame relay connections or between the frame relay connection and ATM connection.

Such an ATM exchange system should ensure interoperation for the existing service, improve the efficiency of ATM network by maintaining the form which flexibly accommodates the existing service.

In prior frame relay service form, there is a method which uses a frame relay switch supports a frame relay protocol. The ATM exchange system and interworking method is that the frame relay terminal or network should maintain a terminal adapter or ATM interworking function including a recognizable signal protocol at the ATM exchange system.

Accordingly, it is problematic that there is possible the connection to ATM exchange system in the case that frame relay subscriber should keep an extra apparatus for ATM interworking function.

SUMMARY OF THE INVENTION

It is an object of the present invention to provide a frame relay interworking service control method with ATM network using a permanent virtual connection, whereby the ATM exchange system directly performs the frame relay interworking function, manages the frame relay subscriber and connection information required to interworking, there can be connected to the ATM exchange system without an extra apparatus by connecting both terminals due to using ATM PVC.

In order to accomplish the above object, the present invention provides a frame relay interworking service control method using a permanent virtual connection, which comprises:

a frame relay subscriber information registration process of verifying a time slot usage state upon receiving a frame relay subscriber registration requirement through a system operator interface, computing an access rate, setting a registered subscriber information to FCIM, and outputting a normal/abnormal result to a frame relay subscriber registration process to a system console; a frame relay subscriber connection registration process of determining whether CIR (Committed Information Rate) for a connection registration in the subscriber is permitted or not upon receiving the frame relay subscriber registration requirement through the system operator interface, generating ATM connection identifier (VPI/VCI) corresponded to the frame relay connection, computing PCR (Peak Cell Rate) corresponded to CIR, Bc (Committed Burst Size), Be (Excess Burst Size) for translating a frame relay traffic and ATM traffic, setting a registered frame relay connection information to FCIM (Frame Relay Interface Controller), outputting a normal/abnormal result to a frame relay connection registration process to a system console; and a PVC interworking process of retrieving a frame relay connection information table by means of the VPI/VCI appointed when interworking PVC (Permanent Virtual Circuit), verifying a compatibility of the interworking required PVC parameter and the frame relay connection, interworking a connection between the registered frame relay subscribers or a connection between the frame relay subscriber and ATM subscriber.

BRIEF DESCRIPTION OF THE DRAWINGS

The above and other objects and features of the present invention will become apparent from the following description of preferred embodiments, when taken in conjunction with the accompanying drawings, in which:

FIG. 3 is a table constructive view for managing a frame relay subscriber profile and connection information for the frame relay interworking in ATM exchange system, (a) is a table having a physical position information to which the frame relay subscriber pertains upon stored in OMCM in FIG. 1.

(b) is a service profile of the frame relay subscriber who is stored in ASCM of ALS in FIG. 1 to which the corresponding frame relay subscriber pertains, (c) is a table illustrating a frame relay connection information to which the corresponding frame relay subscriber pertains, ATM connection relationship corresponded to the frame relay connection.

FIG. 4 shows VPI/VCI translation relationship corresponded to the frame relay connection, (a) shows a translation relationship in the case that the frame relay connection uses 2 byte address, (b) shows a translation relationship in the case that the frame relay connection uses 4 byte address.

DETAILED DESCRIPTION OF THE PREFERRED EMBODIMENTS

Figure 1:
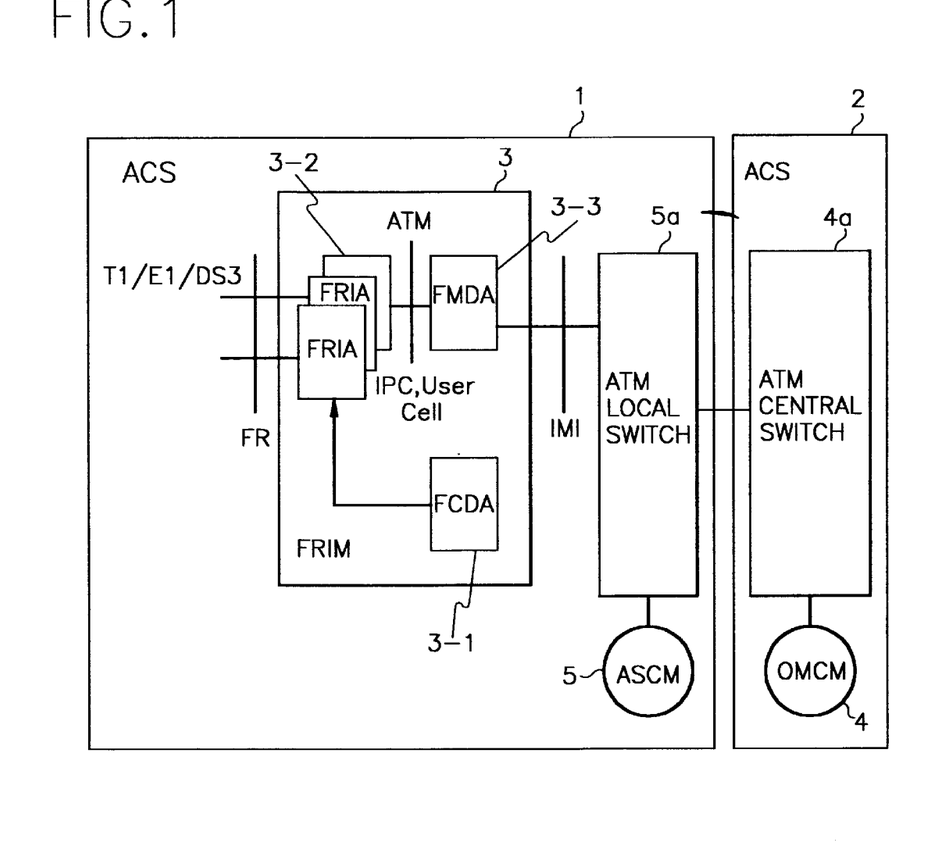
FIG. 1 is a block diagram of ATM exchange system for explaining an embodiment of the present invention.

FIG. 1 is a block diagram of an ATM exchange system for explaining an embodiment of the present invention.

As shown in FIG. 1, the ATM exchange system is composed of an independent switching subsystem unit (ALS:ATM Local switching Subsystem) 1, a central exchange subsystem (ACS:ATM Central switching Subsystem) 2 in the form interworked.

The ATM exchange system is composed of a subscriber interface module (FRIM: Frame Relay Subscriber Interface Module) 3 interworking a frame relay subscriber or frame relay network, OMCM (Operation & Maintenance Module) 4 which performs the operating and maintaining repairing function in the system and an operator interface, and Access Switching Control Module (ASCM) 5 in ALS (ATM Local Switching Subsystem) controlling the subscriber access and connection.

Figure 2:
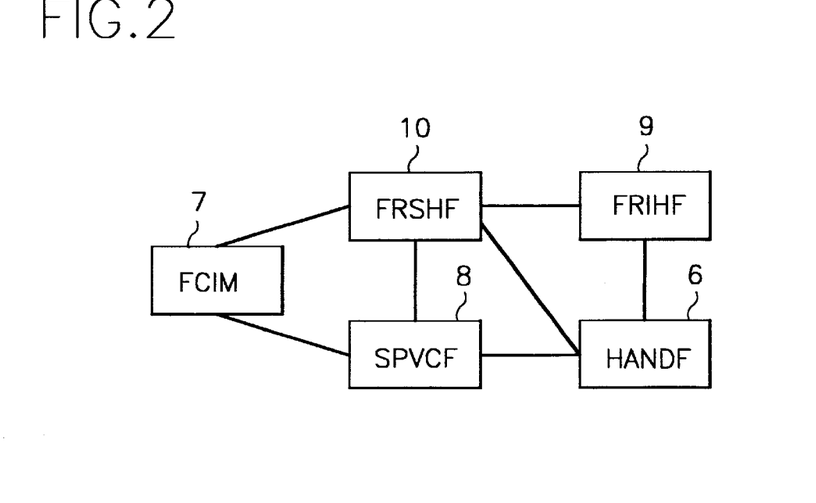
FIG. 2 is a functional block diagram in FIG. 1.

FIG. 2 is a functional block diagram in the ATM exchange system.

As shown in FIG. 2, the ATM exchange system is composed of a HANDF block 6 which connects information for connective establishment and the frame relay subscriber registration required from a system operator, a FCIM (Frame Relay Interface Controller) 7 translating or inverse-translating the frame into ATM, a SPVCF (Semi-permanent Point-to-Point Virtual Connection Control Function block) 8 performing a point-to-point exclusive line service control required from a management plane function, a FRIHF 9 which connects to a FRSHF 10 an input instruction for the frame relay service control from received from the HANDF 6, and a FRSHF (Frame Relay Service Handling) 10 which pertains to the ASCM 5 manages the frame relay subscriber information and connection information, and performs the interworking function according to the frame relay service characteristic and ATM service characteristic.

Figure 3A:
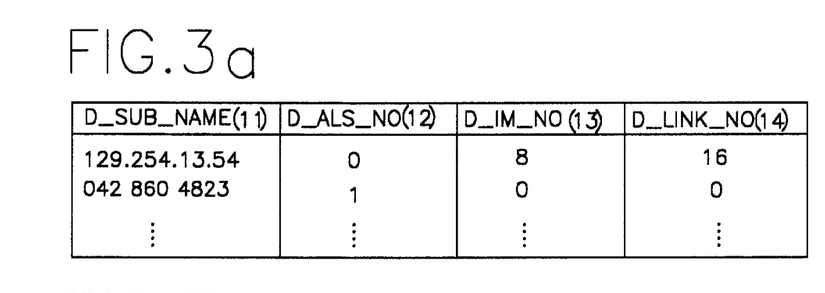
Figure 3B:
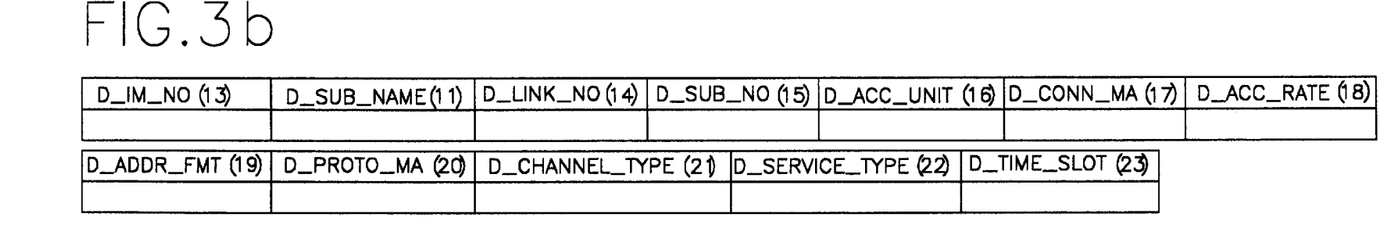
Figure 3C:
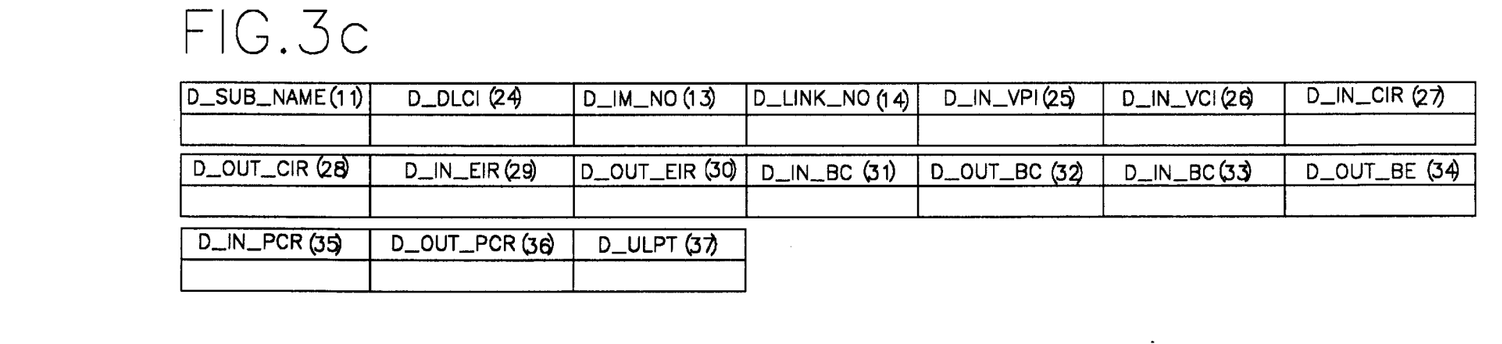

FIGS. 3, (*a*)–(*c*) illustrate a table construction for the frame relay subscriber profile and connective information management for the frame relay interworking in the ATM exchange system.

FIG. 3(*a*) is a table having a physical position information to which the frame relay subscriber pertains upon stored in OMCM 4.

The elements constructing table are as follows.

D_SUB_NAME 11 illustrates an unique name or a subscriber number of a device connected to the ATM exchanger as Character String of 15 digit.

D_ALS_NO 12 illustrates ALS number 1 to which D_SUB_NAME 11 pertains as 1 byte integer.

D_IM_NO 13 illustrates IM number to which D_SUB_NAME 11 pertains as 1 byte integer.

D_LINK_NO 14 illustrates LINK number to which D_SUB_NAME 11 pertains as 1 byte integer.

FIG. 3(*b*) is a service profile of the frame relay subscriber stored in ASCM 5 of ALS 1 to which the corresponding frame relay subscriber pertains.

The elements constructing table are as follows.

D_IM_NO 13 is an integer value of 1 byte as a subscriber matching module.

D_SUB_NAME 11 illustrates an unique name or a subscriber number of a device connected to the ATM exchanger as Character String of 15 digit.

D_ALS_NO 14 illustrates LINK number to which D_SUB_NAME 11 pertains as 1 byte integer.

D_SUB_NO 15 has the value from 1 to 31 in the case of DSIE link, and the value from 1 to 24 in the case of T1 link as a logic number of the subscriber registered in the frame relay subscriber matching module as 1 byte integer.

D_ACC_UNIT 16 illustrates an Access unit of the frame relay subscriber.

D_CONN_MA 17 means the maintenance and repair form of the frame relay connection to which the frame relay subscriber pertains, the form thereof is illustrated in a single direction, both direction, Asynchronous.

D_ACC_RATE 18 illustrates an Access Rate of the frame relay subscriber.

D_ADDR_FMT 19 means an Access Format of the frame relay subscriber, is composed of 2 Byte Address and 4 Byte Address.

D_PROTO_MA 20 means a protocol for the maintenance and repair of the frame relay subscriber, is distinguished into Q933, ANSI, LMI.

D_CHANNEL_TYPE 21 illustrates the form of Channel provided to the frame relay subscriber, is distinguished into Channelized and Unchannelized.

D_SERVICE_TYPE 22 illustrates the form of the frame relay subscriber, is distinguished into one-to-one network interworking service, many-to-one network interworking service, service interworking service.

D_TIME_SLOT 23 illustrates a time slot information allocated to the frame relay subscriber in the form of bit map.

FIG. 3(*c*) is a table illustrating ATM connective relation corresponded to the frame relay connection, and the frame relay connective information to which the corresponding frame relay subscriber pertains. The elements constructing a table are as follows.

D_SUB_NAME 11 illustrates an unique name or a subscriber number of a device connected to the ATM exchanger as Character String of 15 digit.

DLCI 24 is expressed as 4 byte integer of DLCI (Data Link Control Identifier) provided to the frame relay connection.

D_IM_NO 13 is the integer value as the subscriber matching module number.

D_LINK_NO 14 illustrates LINK number to which D_SUB_NAME 11 pertains as 1 byte integer.

D_IN_VPI 25 is expressed as 2 byte integer, is the value of VPI illustrating ATM connection when the frame relay connection is converted to ATM connection.

D_IN_VCI 26 is expressed as 4 byte integer, is the value of VCI illustrating ATM connection when the frame relay connection is translated to ATM connection.

D_IN_CIR 27 is expressed as 4 byte integer, is illustrated in the unit of Kbps as the input value CIR of the frame relay connection.

D_OUT_CIR 28 is expressed as 4 byte integer, is illustrated in the unit of Kbps as the output value CIR of the frame relay connection.

D_IN_EIR 29 is expressed as 4 byte integer, is illustrated in the unit of Kbps as the input value EIR of the frame relay connection.

D_OUT_EIR 30 is expressed as 4 byte integer, is illustrated in the unit of Kbps as the output value EIR of the frame relay connection.

D_IN_BC 31 is expressed as 4 byte integer, is illustrated in the unit of Kbps as the input value BC of the frame relay connection.

D_OUT_BC 32 is expressed as 4 byte integer, is illustrated in the unit of Kbps as the output value BC of the frame relay connection.

D_IN_BE 33 is expressed as 4 byte integer, is illustrated in the unit of Kbps as the input value BE of the frame relay connection.

D_OUT_BE 34 is expressed as 4 byte integer, is illustrated in the unit of Kbps as the output value BE of the frame relay connection.

D_IN_PCR 35 is expressed as 4 byte integer, is the input value PCR when the frame relay connection is converted to ATM connection.

D_OUT_PCR 36 is expressed as 4 byte integer, is the output value PCR when the frame relay connection is converted to ATM connection.

D_IN_ULPT 37 illustrates an upper layer protocol of the frame relay connection, means Transparent and Translation mode.

FIG. 4 illustrates VPI/VCI translation using a frame relay connective information in the case that the frame relay subscriber has 2 byte or 4 byte address.

The frame relay interface is that the connection is distinguished in a FRSA board number, a link number in the FRSA board, a logic number of the subscriber in the link, and DLCI value to which the connection pertains. The connection of ATM interface is distinguished into VPI/VCI.

The subscriber who connects to DS1/E1 uses 2 byte address, 10 bit DLCI. The subscriber who connects to DS3 uses 4 byte or 2 byte address, permits 17 bit DLCI. There should be escaped the conflict with the value of VPI and VCI previously allocated in ATM system, it pertains to this to be used exclusively in the system as the things that related with ATM standard of signalling, OAM etc., and the purpose of communications between processors.

Accordingly, there can escape the conflict setting the VPI and VCI upper bit to "1".

Figure 4A:
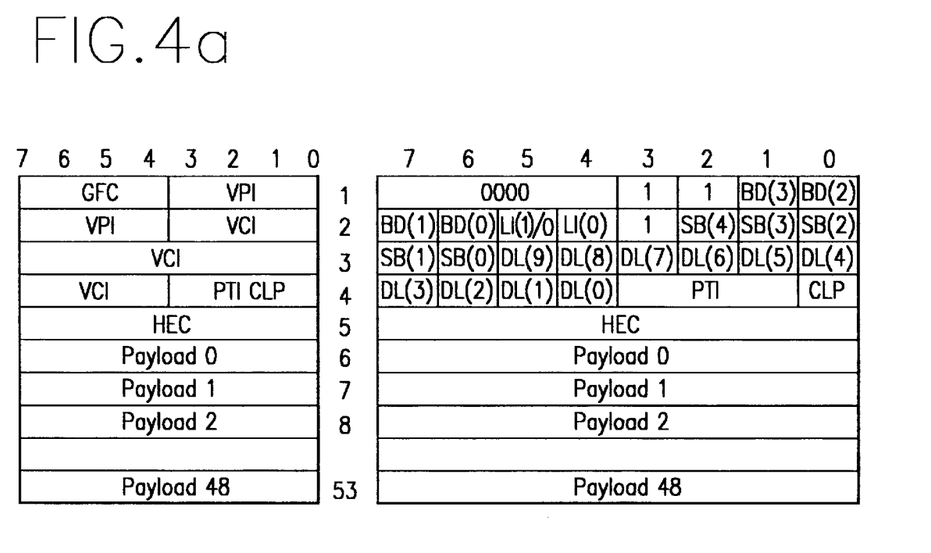

FIG. 4(a) shows the translation relation in the case that the frame relay connection uses 2 byte address. The bits 7 through 4 of a first octet in the region GFC of ATM cell are set to "0", the bits 7 and 6 in the region VPI of ATM cell are set to "1", the bits 5 through 2 are set to FRSA board number. The bits 1 and 0 generate VPI setting Link number in FRSA. The VCI of ATM cell sets bits 15 to 1, bits 14 to 10 are set to a logic number of the subscriber, bits 9 through 0 are set to DLCI, to generate the value of VCI.

Figure 4B:
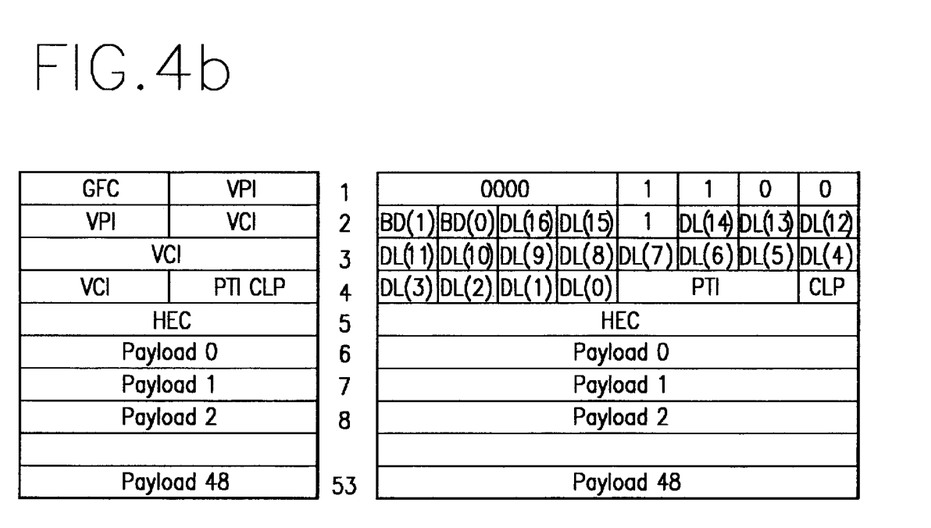

FIG. 4(b) shows the translation relation in the case that the frame relay connection uses 4 byte address. The bits 7 to 4 of a first octet in the region GFC of ATM cell are set to "0", the bits 7 and 6 in the region VPI of ATM cell are set to "1", the bits 5 to 4 are set to "0". The bits 3 to 2 are set to FRSA board number, the bits 1 and 0 generate VPI setting the bits 16, 17 value of DLCI. VCI of ATM cell sets bit 15 to 1, the bits 14 to 0 are set to the bits 14 to 0 of DLCI, to generate the value of VCI.

FIGS. 5 through 10 are that the frame relay interworking service control method using a permanent virtual connection for explaining the embodiment of the present invention comprises a frame relay subscriber information registration process which verifies the usage state of a time slot upon receiving a frame relay subscriber registration requirement through a system operator interface, computes an access rate, sets the registered subscriber information to FCIM, and outputs normal/abnormal results to the frame relay subscriber registration process to the system console, a frame relay subscriber connection registration process which decides whether CIR (Committed Information Rate) permits or not for the connective registration in the subscriber upon receiving the frame relay subscriber registration requirement through the system operator interface, generates ATM connective identifier (VPI/VCI) corresponded to the frame relay connective result, computes PCR (Peak Cell Rate) corresponded to CIR, Bc (Committed Burst Size), Be (Excess Burst Size) for translating a frame relay traffic and ATM traffic, sets the registered frame relay connection information to FCIM (Frame Relay Interface Controller), and outputs the normal/abnormal result to the frame relay connection registration process to the system console, a PVC setting process which verifies a frame relay connection information table by means of the appointed VPI/VCI when requiring PVC connection in the case of the interface aaat the time of interworking PVC (Permanent Virtual Circuit), verifies the frame relay connection and PVC parameter compatibility whose the connection is required, and interworks the connection between the frame relay subscribers registered in ATM exchange system and the connection between the frame relay subscriber and ATM subscriber.

Figure 5:
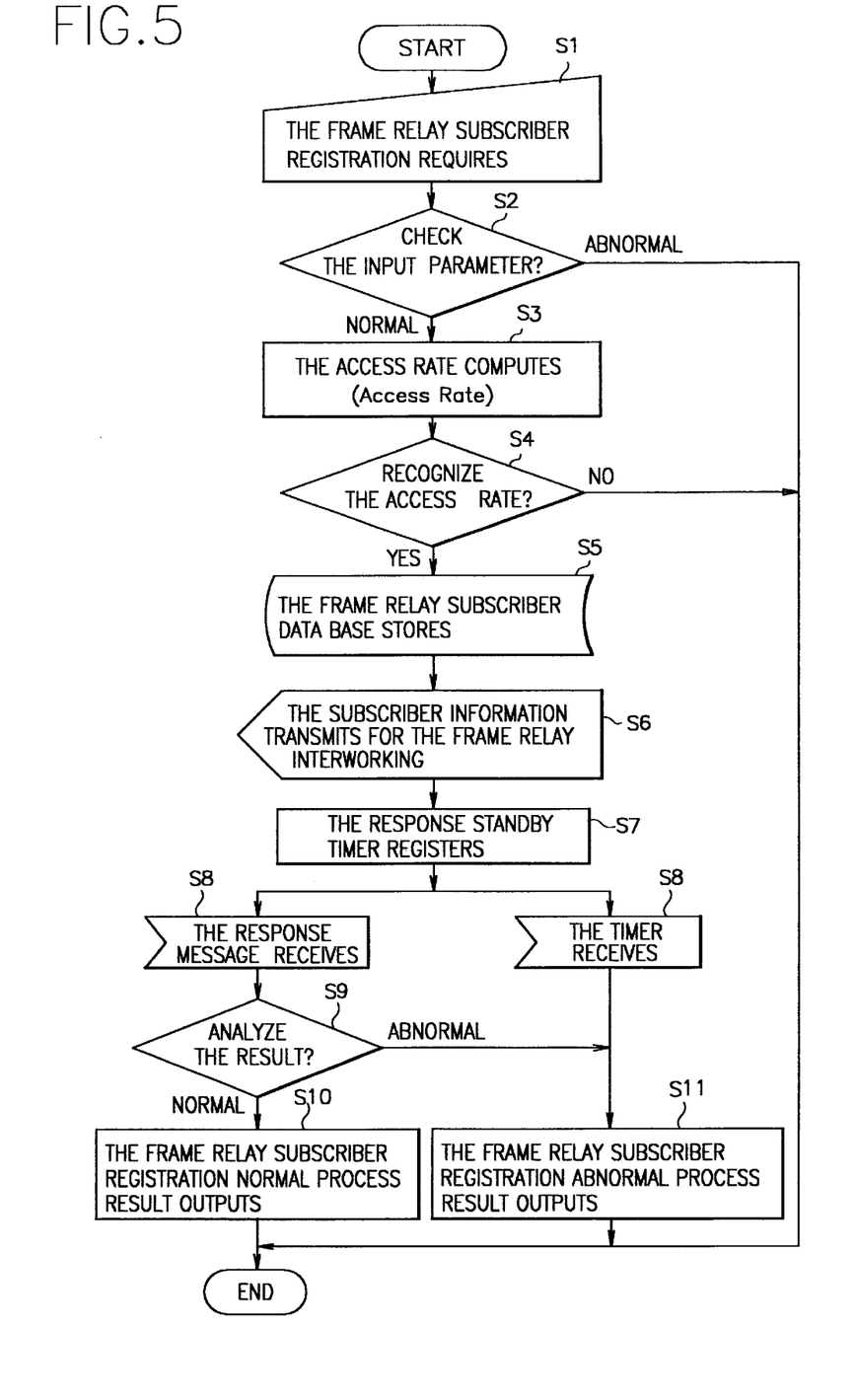
FIG. 5 is a flow chart showing the process of registering a frame relay subscriber in ATM exchange system through an operator interface.

FIG. 5 is a flow chart showing the process of registering a frame relay subscriber in ATM exchange system through an operator interface, which performs the following steps.

In the first step S1, the frame relay subscriber's service information registration requirement is received from HANDF 6.

In the second step S2, the parameter appointed when registering the frame relay subscriber verifies an input parameter distinguished into Mandatory and Optional.

The Mandatory parameter is expressed as 15 digit character to the frame relay subscriber number (name) exclusively provided in the system, it illustrates whether the position information, service form of ALS/FCIM/LINK whose the subscriber will be registered are Channelized/Unchannelized.

The Optional parameter can be appointed to a Time Slot to be used in the case of Channelized, Protocol, UDR (Uni-directional), BDR (Bi-directional), ASYNC (Asynchronous) as Connection Maintenance, and the Access Unit analyzes the service attribute concerning whether 56 Kbps/64 Kbps, service interworking/network interworking, Address Format are 2 byte/4 byte.

In the case of deciding in abnormal according to the analysis result, to perform the eleventh step, in the case of in normal, to perform the following step.

In the third step S3, the Access Rate provided to the subscriber is computed by multiplying Access unit (56 Kbps, 64 Kbps) by Time Slot number which the subscriber uses.

In the fourth step (S4), in the case that the addition of the Access Rate of the subscriber of which the registration is required to the Access Rate which the subscribers registered in Link uses exceeds the maximum access capacitance of Link, the subscriber registration is rejected, to perform the eleventh step (S11). In the case of no exceeding the Access Rate, to the following step.

In the fifth step (S5), the service information of the subscriber whose the registration is required is stored in the database.

In the sixth step (S6), to transmit the subscriber information registered to FCIM (Frame Relay Interface Controller).

In the seventh step (S7), to register 5 second standby timer for receiving a response message from FCIM.

In the eighth step (S8), in the case of receiving the response message from FCIM, to perform the following step, in the case of receiving a standby timer without receiving the response from FCIM, to perform the eleventh step (S11).

In the ninth step (S9), if the frame relay subscriber information is decided in the things that registered normally in FCIM, analyzing the message received from FCIM.

In the tenth step (S10), to output the message concerning that the frame relay subscriber registration has completed to the system console. At this time, to output Access Rate provided to the subscriber and the inputted parameter, to end the frame relay subscriber registration.

In the eleventh step (S11), the frame relay subscriber registration is rejected, the message comprising the rejected reason is outputted to the system console, and to end the frame relay subscriber registration process.

Figure 6:
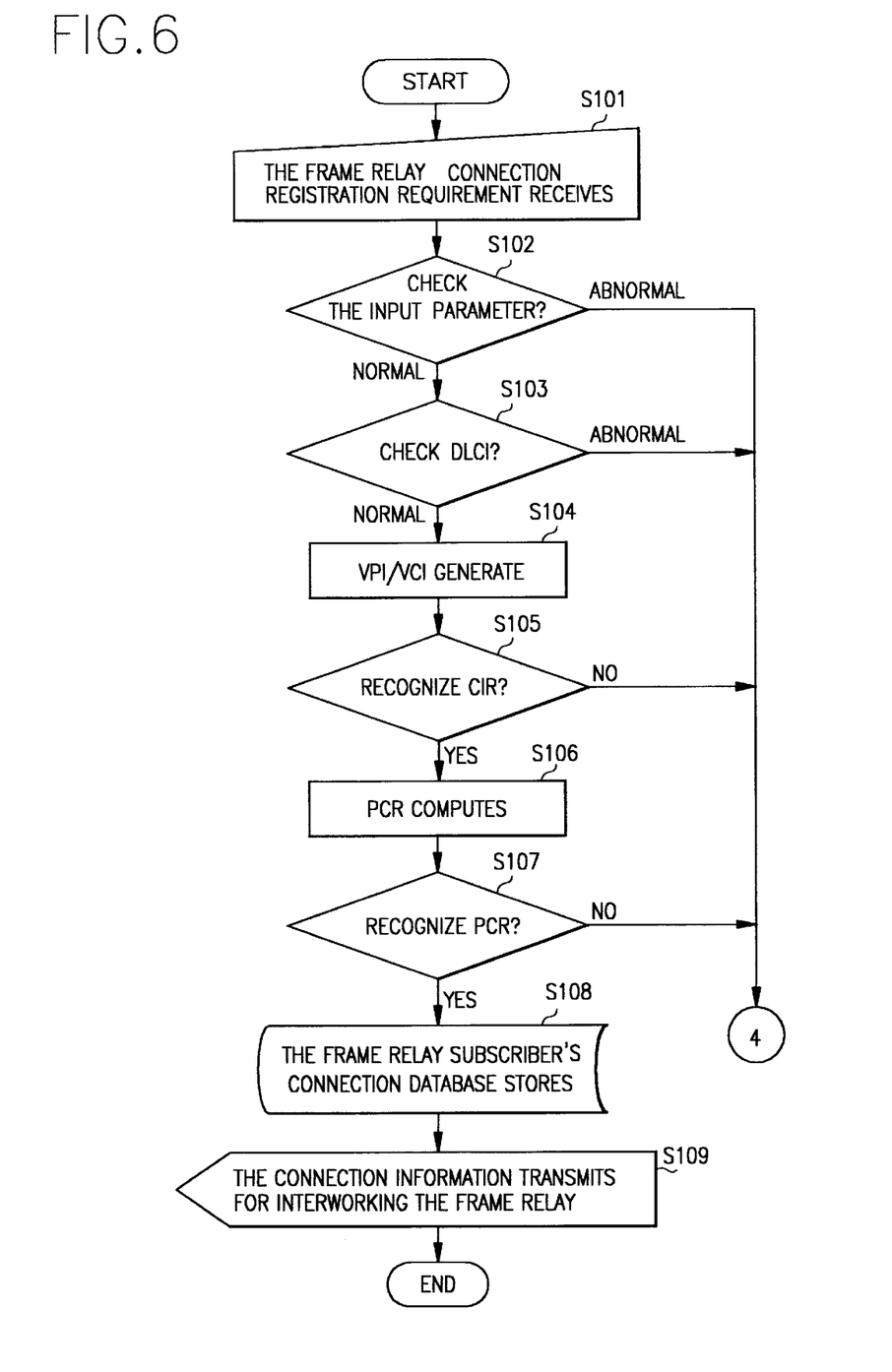
FIGS. 6 and 7 are flow charts showing the process of registering a frame relay connection in ATM exchange system to a frame relay subscriber registered in ATM exchange system.
Figure 7:
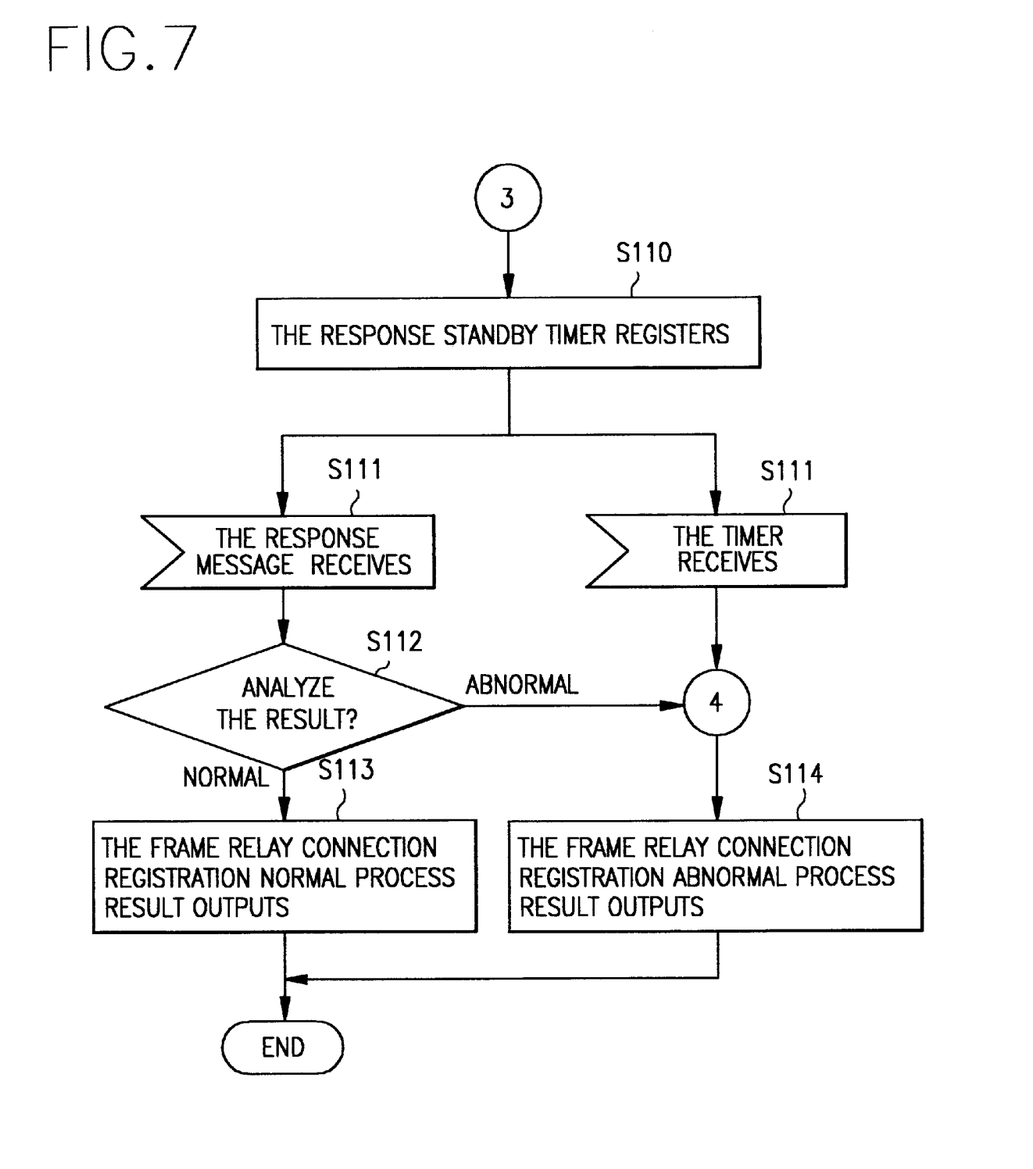

FIGS. 6 and 7 are flow charts showing the process of registering a frame relay connection in ATM exchange system to a frame relay subscriber registered in ATM exchange system, which performs the following step.

In the first step S101, the frame relay subscriber's connection registration requirement is received from HANDF 6.

In the second step S102, to verify an input parameter distinguished into Mandatory and Optional appointed when registering the frame relay connection.

The Mandatory parameter is expressed as 15 digit character to the frame relay subscriber number (name) exclusively provided to the system, there are appointed DLCI as the frame relay connection identifier, the input and output sides CIR (Committed Information Rate) of which the frame relay connection is used, BC (Committed Burst Size), Be (Excess Burst Rate).

The Optional parameter appoints an upper layer protocol form (Transparent, Translation) in the case that the subscriber to which the frame relay connection pertains is the service interworking. In the case that the error exists in the input parameter, to perform the 14 step (S104), if not, to perform the following step.

In the 3 step (S103), DLCI distinguishes the frame relay connection, there is different the usage range according to the frame header form, there can not be used the reserved value in the purpose except for transmitting the user information. In the case of using 2 byte header form, 16 to 991 are permitted to transmit the user information, in the case of 4 byte header, 2048 to 126975 are permitted.

In the 3 step (S103), in order to translate the frame terminated in the frame relay interface into ATM cell, the translation of DLCI and VPI/VCI is performed. Furthermore, ATM cell terminated in ATM interface is constructed into the frame header. There becomes one-to-one mapping between DLCI and VPI/VCI at the time of one-to-one network interworking and service interworking.

However, in the case of many-to-one interworking of whose one more frame relay connection is mapped to one ATM connection, DLCI for generating VPI/VCI sets to 1022, when performing Frame-to-ATM in FCIM 7, several frame connections are mapped to one ATM connection.

In the 5 step (S105), the frame relay subscriber comprises one more connection. If the addition of CIR of the registration required frame relay connection to CIR of the connections registered in the subscriber exceeds Access Rate provided to the subscriber, to perform the 14 step (S104), if not, to perform the following step.

In the 6 step (S106), the traffic rate of the frame relay interface is different from that of ATM interface. Accordingly, the frame relay traffic characteristic should be translated into ATM traffic characteristic. In order to translate the frame relay traffic parameter into ATM traffic parameter, the traffic should be compared in the case of being translated into ATM cell in the frame, the difference between these can be computed by overhead required respectively.

There should be performed the translation between the frame relay traffic observation parameter (CIR, Bc, Be, Access Rate) and ATM parameter (PCR). The measuring period T and EIR (Excess Information Rate) and PCR (Peak Cell Rate) are computed as the following Equations (1), (2), and (3).

$$T = Bc/CIR \qquad \text{[Equation 1]}$$

$$EIR = Be/T = (Be * CIR)/Bc \qquad \text{[Equation 2]}$$

$$PCR(0+1) = \{(CIR+EIR)/8\} * (1.5/53) \; PCR(0) = CIR * (1.5/53) \qquad \text{[Equation 3]}$$

In the 7 step (S107), several subscriber Links are connected to one ATM switch due to multiplexing, as a result, PCR whose all connections interworked to the subscriber Link are used can not exceed an maximum PCR permission quantity of ATM switch interworking portion. In the case that the addition of PCR whose all connections pertain to ATM switch interworking Link and PCR permitted to the registration required frame relay connection exceeds an maximum permissible PCR, the 14 step (S114) is performed, if not, the following step is performed.

In the 8 step (S108), the registration required frame relay connection information is stored in the database.

In the 9 step (S109), the registered connection information is transmitted to FCIM.

In the 10 step (S110), 5 second standby timer is registered to receive the response message from FCIM.

In the 11 step (S111), in the case of receiving the response message from FCIM, to perform the next step, in the case of receiving the standby timer without receiving the response from FCIM, to perform the 14 step (S114).

In the 12 step (S112), if it is determined that the frame relay connection information is normally registered in FCIM, analyzing the message received from FCIM, to perform the next step, if not, to perform the 14 step (S114).

In the 13 step (S113), to output the message about that the the frame relay connection registration has completed to system console. At this time, to output VPI/VCI and PCR corresponded to the inputted parameter and frame relay connection, to end the frame relay connection registration process.

Figure 8:
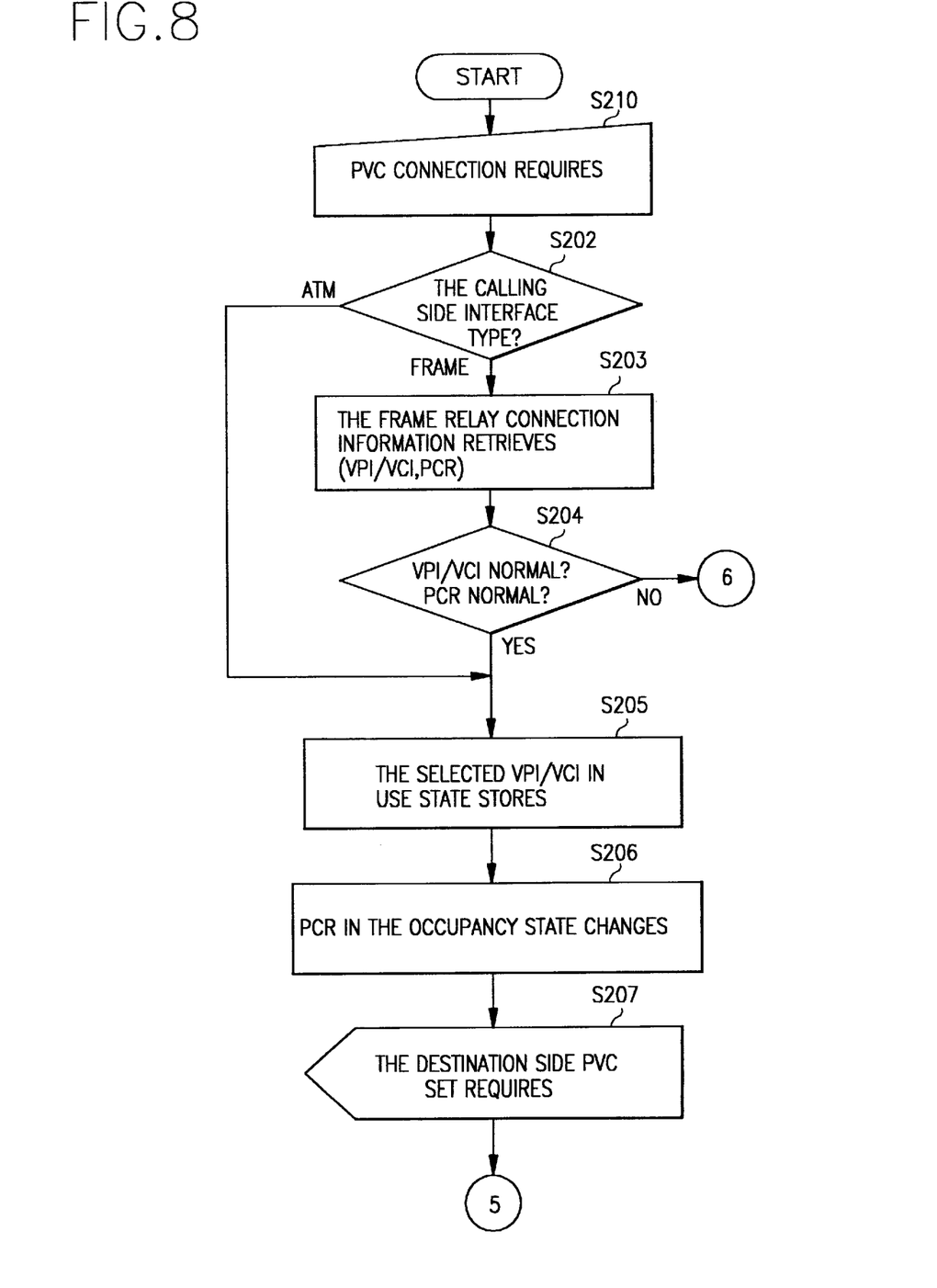
FIGS. 8 through 10 are flow charts showing the process of connecting PVC between the frame relay subscribers registered in ATM exchange system or between the frame relay subscriber and ATM subscriber.
Figure 9:
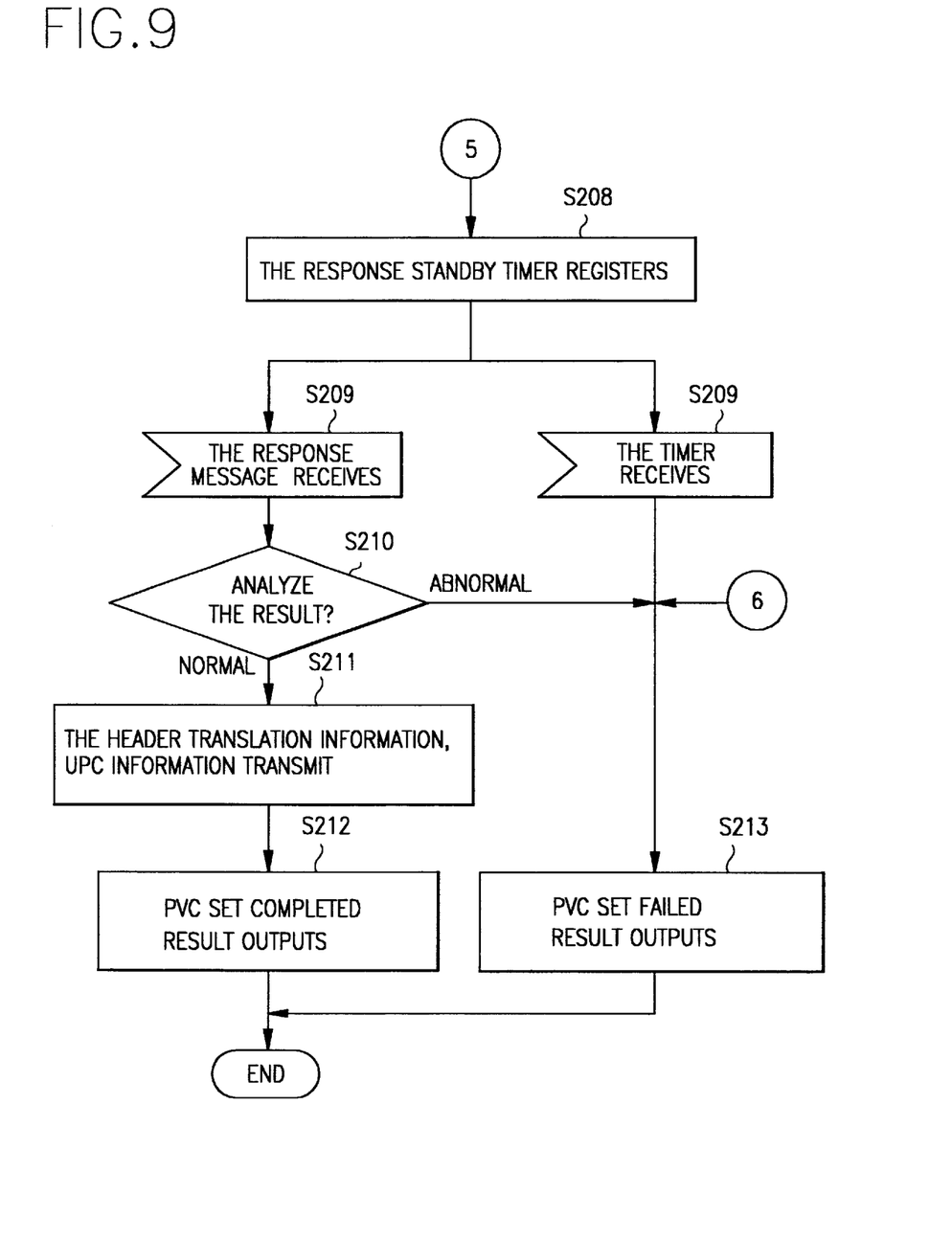
Figure 10:
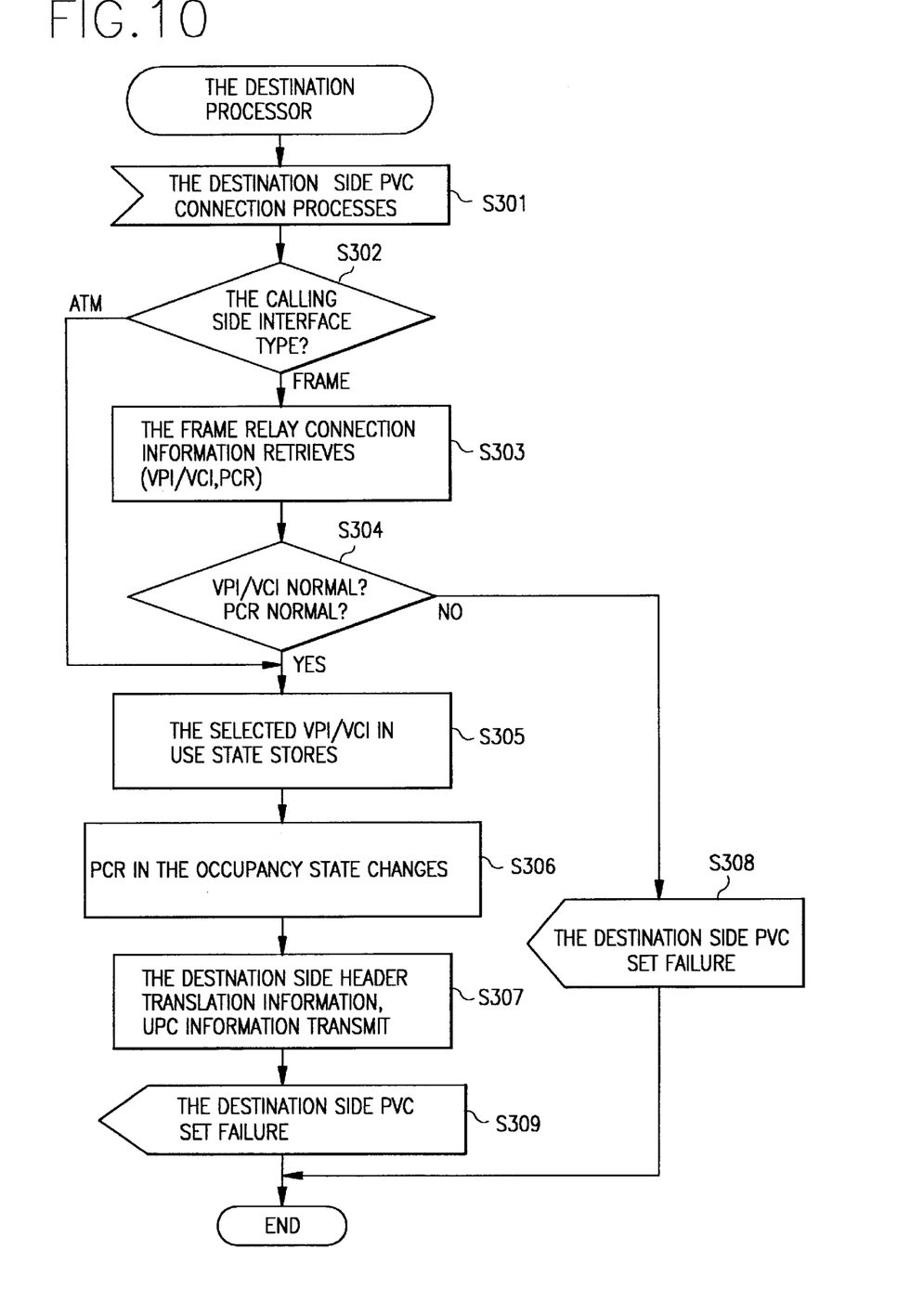

FIGS. 8 through 10 are flow charts showing the process of connecting PVC between the frame relay subscribers registered in ATM exchange system or between the frame relay subscriber and ATM subscriber.

The PVC interworking is divided into a origination side process step and a destination side process step.

First, there will be explained the origination side PVC interworking process step as follows.

In the 1 step (S201), to receive PVC interworking requirement through an operator interface.

In the 2 step (S202), to perform the 5 step (S205) in the case of ATM, analyzing whether the origination side interface form is the frame relay or ATM, then in the case of the frame relay interface, to perform the following step.

In the 3 step (S203), to confirm VPI/VCI and PCR, retrieving the frame relay connection information shown in FIG. 3(c).

In the 4 step (S204), to perform the 13 step in the case that the VPI/VCI, PCR appointed at the time of interworking PVC are different from the VPI/VCI, PCR retrieved in the 3 step, if not, to perform the next step.

In the 5 step (S205), to change the state of VPI/VCI to in use.

In the 6 step (S206), to confirm the PCR which ATM PVC corresponded to the frame relay connection uses in the occupancy state.

In the 7 step (S207), to transmit the message for the PVC interworking requirement to the destination side process.

In the 8 step (S208), to register 5 second standby timer for receiving the response message from the destination side.

In the 9 step (S209), to perform the next step in the case of receiving the response message from the destination side, to perform the 13 step (S213) in the case of receiving the standby timer without receiving the response from the destination side.

In the 10 step (S210), if it is determined that PVC interworking is normally performed analyzing the message received from the destination side, to perform the next step, if not, to perform the 13 step (S213).

In the 11 step (S211), to transmit the header translation information and UPC information for PVC to FCIM.

In the 12 step (S212), to output to the system console the message about that the PVC interworking has completed, to end the origination side process.

In the 13 step (S213), to output to the system console the message which includes that the PVC interworking is failed and the failed cause, to end the origination side process.

Hereinafter, there will be explained the destination side PVC interworking process step as follows.

In the 1 step (S301), to receive the PVC interworking requirement from the origination side process.

In the 2 step (S302), to perform the 5 step (S305) in the case of ATM analyzing whether the destination side interface form is the frame relay or ATM, to perform the next step in the case of the frame relay interface.

In the 3 step (S303), to confirm VPI/VCI and PCR retrieving the frame relay connection information shown in FIG. 3(c).

In the 4 step (S304), to perform the 9 step (S309) in the case that the VPI/VCI, PCR appointed at the time of interworking PVC are different from VPI/VCI, PCR retrieved in the 3 step, if not, to perform the next step.

In the 5 step (S305), to change the state of VPI/VCI to in use.

In the 6 step (S306), to confirm the PCR which ATM PVC corresponded to the frame relay connection uses in the occupancy state.

In the 7 step (S307), to transmit the header translation information and UPC information for PVC to the destination side FCIM.

In the 8 step (S308), to transmit the massage about that the destination side PVC interworking has completed to the origination side process, to end the destination side process.

In the 9 step (S309), to transmit the massage about that the destination side PVC interworking has failed to the origination side process, to end the destination side process.

The present invention can register the frame relay subscriber's service information, and the frame relay connection to the registered subscriber, interwork ATM exchange system inner path to the registered frame relay connection to PVC, therfore, it has an effect that can be interworked with ATM exchange system without the extra device or function to the existing frame relay subscriber/network since ATM exchange system directly accommodates the frame relay interface.

As described above, although the present invention has been described in detail with reference to illustrative embodiments, the invention is not limited thereto and various modifications and changes may be effected by one skilled in the art within the scope of the invention.

What is claimed is:

1. A frame relay interworking service control method using a permanent virtual connection comprising:

a frame relay subscriber information registration process of verifying a time slot usage state upon receiving a frame relay subscriber registration requirement through a system operator interface, computing an access rate, setting a registered subscriber information to FCIM, and outputting a normal/abnormal result to a frame relay subscriber registration process to a system console;

a frame relay subscriber connection registration process of determining whether CIR (Committed Information Rate) for a connection registration in the subscriber is permitted or not upon receiving the frame relay subscriber registration requirement through the system operator interface, generating ATM connection identifier (VPI/VCI) corresponded to the frame relay connection, computing PCR (Peak Cell Rate) corresponded to CIR, Bc (Committed Burst Size), Be (Excess Burst Size) for translating a frame relay traffic and ATM traffic, setting a registered frame relay connection information to FCIM (Frame Relay Interface Controller), outputting a normal/abnormal result to a frame relay connection registration process to a system console; and a PVC interworking process of retrieving a frame relay connection information table by means of the VPI/VCI appointed when interworking PVC (Permanent Virtual Circuit), verifying a compatibility of the interworking required PVC parameter and the frame relay connection, interworking a connection between the registered frame relay subscribers or a connection between the frame relay subscriber and ATM subscriber.

2. The frame relay interworking service control method using a permanent virtual connection according to claim 1, wherein said frame relay subscriber registration process comprises:

a first sub-process of analyzing an input parameter of which an appointed parameter is distinguished into Mandatory and Optional at the time of a frame relay subscriber registration in the case of receiving a service information registration requirement of the frame relay subscriber from HANDF;

a second sub-process of rejecting a frame relay subscriber registration in the case that an analysis result in said first sub-process is determined in abnormal, ending a frame relay subscriber registration process upon outputting a message containing the rejecting cause to the system console, and computing the access rate provided to the subscriber by means of multiplying an access unit by the number of the time slot which the subscriber uses;

a third sub-process of determining whether the addition of the access rate which the subscribers registered in Link uses to the registration required subscriber's access rate exceeds an maximum access capacitance;

a fourth sub-process of rejecting the subscriber registration in the case of exceeding the access rate according to the determining result in the third sub-process, ending the frame relay subscriber registration process upon outputting the message containing the rejecting cause to a system console, storing the registration required subscriber's service information in the database in the case of no exceeding the access rate, subsequently transmitting the registered subscriber information to FCIM (Frame Relay Interface Controller), and registering 5 second standby timer for receiving the response message from FCIM;

a fifth sub-process of rejecting the frame relay subscriber registration in the case of receiving the standby timer without receiving the response from said FCIM, ending the frame relay subscriber registration process upon outputting the message containing the rejecting cause to the system console, and determining whether the frame relay subscriber information is normally registered in FCIM upon analyzing the message from received the FCIM in the case of receiving the response message from the FCIM; and a sixth sub-process of rejecting the frame relay subscriber registration in the case of abnormally registered according to the determining result in said fifth sub-process, ending the frame relay subscriber registration process upon outputting the message containing the rejecting cause to the system console, outputting the message about that the frame relay subscriber registration has completed in the case of registered normally to the system console, and ending the frame relay subscriber registration process.

3. The frame relay interworking service control method using a permanent virtual connection according to claim 2, wherein said Mandatory parameter in said first sub-process is expressed as 15 digit character to a frame relay subscriber's number (name) exclusively provided to the system, illustrates whether a position information, service form of ALS/FCIM/LINK whose the subscriber is registered are Channelized/Unchannelized.

4. The frame relay interworking service control method using a permanent virtual connection according to claim 2, wherein said Optional parameter is appointed to by means of Time Slot, to be used in the case of Channelized, UDR (Unidirectional), BDR (Bi-directional), ASYNC (Asynchronous) as Connection Maintenance Protocol.

5. The frame relay interworking service control method using a permanent virtual connection according to claim 2, wherein the message outputted in the sixth sub-process is an outputted parameter and Access Rate provided to the subscriber.

6. The frame relay interworking service control method using a permanent virtual connection according to claim 1, wherein said frame relay subscriber connection registration process comprises:

a first sub-process of determining an input parameter which is distinguished into Mandatory and Optional appointed at the time of a frame relay connection registration in the case of receiving a connection registration requirement of said frame relay subscriber from HANDF;

a second sub-process of rejecting a frame relay connection registration in the case that an input parameter according to the determining result in said first sub-process is erroneous, ending the frame relay connection registration process upon outputting a message containing the rejecting cause to the system console, checking DLCI in the case that the input parmeter is not erroneous;

a third sub-process of rejecting a frame relay connection registration in the case that DLCI according to a checking result in said second sub-process is abnormal, ending a frame relay connection registration process upon outputting a message containing the rejecting cause to the system console, and performing the translation of DLCI and VPI/VCI to translate the frame terminated in the frame relay interface into ATM cell in the case that DLCI is normal;

a fourth sub-process of determining whether the addition of CIR of the connections registered in the subscriber to CIR of the registration required frame relay connection exceeds Access Rate provided to the subscriber;

a fifth sub-process of rejecting the frame relay connection registration in the case of exceeding the access rate according to the determining result in the fourth sub-process, ending the frame relay connection registration process upon outputting the message containing the rejecting cause to a system console, comparing the traffic in the case of translating a frame relay traffic parameter into ATM traffic parameter in the case of no exceeding the access rate, computing the difference between these by means of Overhead required respectively;

a sixth sub-process of determining whether the addition of PCR whose all connections pertain to ATM switch interworking Link to PCR permitted to the registration required frame relay connection exceeds an maximum permissible PCR;

a seventh sub-process of rejecting the frame relay connection registration according to the determining result in said sixth process, ending the frame relay connection registration process upon outputting the message containing the rejecting cause to the system console, storing the registration required frame relay connection information in the database in the case of no exceeding the access rate, subsequently transmitting the registered connection information to FCIM (Frame Relay Interface Controller), and registering 5 second standby timer for receiving the response message from FCIM;

an eighth sub-process of rejecting the frame relay connection registration in the case of receiving the standby timer without receiving the response from said FCIM, ending the frame relay connection registration process upon outputting the message containing the rejecting cause to the system console, and determining whether the frame relay connection information is normally registered in FCIM upon analyzing the message received from the FCIM in the case of receiving the response message from the FCIM; and a ninth sub-process of rejecting the frame relay connection registration in the case of abnormally registered according to the determining result in said eighth sub-process, ending the frame relay connection registration process upon outputting the message containing the rejecting cause to the system console, outputting the message about that the frame relay connection registration has completed in the case of registered normally to the system console, and ending the frame relay connection registration process.

7. The frame relay interworking service control method using a permanent virtual connection according to claim 6, wherein said Mandatory parameter in said first sub-process is expressed as 15 digit character to the frame relay subscriber number (name) exclusively provided to the system, there are appointed DLCI as the frame relay connection identifier, CIR (Committed Information Rate), Bc (Committed Burst Size), Bc (Execess Burst Rate) of an input and output side whose the frame relay connection can be used.

8. The frame relay interworking service control method using a permanent virtual connection according to claim 6, wherein said Optional parameter in said first sub-process appoints an upper layer protocol form (Transparent Translation)
in the case that the subscriber to which the frame relay connection pertains is a service interworking.

9. The frame relay interworking service control method using a permanent virtual connection according to claim 6, wherein DLCI in said second sub-process permits from 16 to 991 to transmit the subscriber information in the case of using 2 byte header, and permits from 2048 to 126975 in the case of using 4 byte header.

10. The frame relay interworking service control method using a permanent virtual connection according to claim 6,
wherein DLCI and VPI/VCI translated in said third sub-process
is mapped to one-to-one between each other at the time of one-to-one network interworking and service interworking.

11. The frame relay interworking service control method using a permanent virtual connection according to claim 6,
wherein DLCI for generating VPI/VCI in said third sub-process sets to 1022 in the case of many-to-one connection whose one more frame relay connection is mapped to one ATM connection,
when performing Frame-to-ATM in FCIM, several frame connections are mapped to one ATM connection.

12. The frame relay interworking service control method using a permanent virtual connection according to claim 6,
wherein a frame relay traffic observation parameter in said fifth sub-process is CIR, Bc, Be, Access Rate, and ATM parameter is PCR.

13. The frame relay interworking service control method using a permanent virtual connection according to claim 12,
wherein said PCR is obtained by computing as the following Equation (1)

$$PCR(0+1)=\{(CIR+EIR)/8\} * (1.5/53) \; PCR(0)=CIR * (1.5/53).$$

14. The frame relay interworking service control method using a permanent virtual connection according to claim 13,
wherein said EIR is obtained by computing as the following Equation (2)

$$EIR=Be/T=(Bc*CIR)/Bc.$$

15. The frame relay interworking service control method using a permanent virtual connection according to claim 14,
wherein said measuring period (T) is obtained by computing Bc as CIR.

16. The frame relay interworking service control method using a permanent virtual connection according to claim 6,
wherein the message outputted in said 8 sub-process is VPI/VCI and PCR corresponded to the inputted parameter and frame relay connection.

17. The frame relay interworking service control method using a permanent virtual connection according to claim 1,
wherein said PVC interworking process is composed of a origination side PVC interworking process and a destination side PVC interworking process.

18. The frame relay interworking service control method using a permanent virtual connection according to claim 17,
wherein said origination side PVC interworking process comprises:
a first sub-process of analyzing whether a origination side interface form is a frame relay or ATM in the case of receiving PVC interworking requirement through an operator interface;
a second sub-process of performing a third sub-process in the case ATM according to the analysis result in said first sub-process, confirming VPI/VCI and PCR upon retrieving the frame relay connection information in the case of the frame relay interface, determining whether VPI/VCI, PCR appointed in interworking PVC equal to VPI/VCI, PCR confirmed, ending the origination side process upon outputting the message including that PVC interworking is failed and the failed cause to the system console in the case of different according to the determining result;
a third sub-process of changing the state of VPI/VCI to in use in the case of equal according to the determining result in said second sub-process, confirming PCR which ATM PVC uses corresponded to the frame relay connection in the occupancy state, transmitting the message for the PVC interworking requirement to a destination side process, registering 5 second standby timer for receiving the response message from the destination side;
a fourth sub-process of ending the origination side process upon outputting the message including that PVC interworking is failed and the failed cause to the system console in the case that receiving the standby timer without receiving the response from the destination side, determining whether the PVC interworking is performed in normal upon analyzing the message received from the destination side in the case of receiving the response message from the destination side; and
a fifth sub-process of ending the origination side process upon outputting the message including that PVC interworking is failed and the failed cause to the system console in the case of abnormal according to the determining result in said fourth sub-process, transmitting a header translation information and UPC information to PVC to FCIM in the case of performed in normal, and ending the origination side process upon outputting the message about that PVC interworking has completed to the system console.

19. The frame relay interworking service control method using a permanent virtual connection according to claim 17,
wherein said destination side PVC interworking process comprises:
a first sub-process of analyzing whether a destination side interface form is a frame relay or ATM in the case of receiving PVC interworking requirement from the origination process;
a second sub-process of performing a third sub-process in the case ATM according to the analysis result in said first sub-process, confirming VPI/VCI and PCR upon retrieving the frame relay connection information in the case of the frame relay interface, determining whether VPI/VCI, PCR appointed in interworking PVC equal to VPI/VCI, PCR confirmed, transmitting the message about that the destination side PVC interworking is failed to a origination side process in the case of different according to the determining result, ending the destination side process;
a third sub-process of changing the state of VPI/VCI to in use in the case of equal according to the determining result in said second sub-process, confirming PCR which ATM PVC uses corresponded to the frame relay connection in the occupancy state, transmitting the message for the PVC interworking requirement to a origination side process, transmitting a header translation information and UPC information to PVC to the destination side FCIM, transmitting the message about that the destination side PVC interworking has completed to the origination side process, and ending the destination side process.

* * * * *

UNITED STATES PATENT AND TRADEMARK OFFICE
CERTIFICATE OF CORRECTION

PATENT NO.    : 6,222,844 B1
DATED         : April 24, 2001
INVENTOR(S)   : Mi Sook Han et al.

It is certified that error appears in the above-identified patent and that said Letters Patent is hereby corrected as shown below:

Title page,
Item 73 Assignee: Replace "Electronics and Telecommunications Research Institute, Daejeon (KR)" with -- Electronics and Telecommunications Research Institute, Daejeon, Rep. of Korea and Korea Telecom, Rep. of Korea --

Signed and Sealed this

Eleventh Day of September, 2001

*Attest:*

NICHOLAS P. GODICI
*Attesting Officer*    *Acting Director of the United States Patent and Trademark Office*